United States Patent
Sagna et al.

(10) Patent No.: US 9,494,291 B2
(45) Date of Patent: Nov. 15, 2016

(54) MOTOR VEHICLE LIGHTING AND/OR SIGNALING DEVICE

(71) Applicant: Valeo Vision, Bobigny (FR)

(72) Inventors: Boubacar Sagna, Sartrouville (FR); Antoine De Lamberterie, Paris (FR); Pierre-Louis Tassy, Asnieres sur Seine (FR); Florestan Debert, Nomain (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/430,008

(22) PCT Filed: Sep. 20, 2013

(86) PCT No.: PCT/EP2013/069589
§ 371 (c)(1),
(2) Date: Mar. 20, 2015

(87) PCT Pub. No.: WO2014/048848
PCT Pub. Date: Apr. 3, 2014

(65) Prior Publication Data
US 2015/0233539 A1      Aug. 20, 2015

(30) Foreign Application Priority Data
Sep. 26, 2012 (FR) .................... 12 59013

(51) Int. Cl.
*B60Q 3/02* (2006.01)
*F21S 8/10* (2006.01)

(52) U.S. Cl.
CPC ............. *F21S 48/2281* (2013.01); *B60Q 3/02* (2013.01)

(58) Field of Classification Search
CPC ................ G02B 6/0023; G02B 6/0048; G02B 6/0033; G02B 6/0058; B60Q 3/02; B60Q 3/002; B60Q 3/004; F21S 48/2281
USPC ......................................... 362/511
See application file for complete search history.

(56) References Cited

U.S. PATENT DOCUMENTS

| | | | |
|---|---|---|---|
| 4,918,577 A * | 4/1990 | Furudate | G02B 6/0018 362/23.15 |
| 5,197,792 A | 3/1993 | Jiao et al. | |
| 5,890,796 A | 4/1999 | Marinelli et al. | |
| 6,896,397 B2 | 5/2005 | Yamada et al. | |
| 6,955,459 B2 | 10/2005 | Mochizuki et al. | |

(Continued)

FOREIGN PATENT DOCUMENTS

| | | |
|---|---|---|
| DE | 19756596 A1 | 7/1998 |
| DE | 10341103 A1 | 3/2004 |

(Continued)

*Primary Examiner* — Karabi Guharay
(74) *Attorney, Agent, or Firm* — Jacox, Meckstroth & Jenkins

(57) ABSTRACT

A device for or passenger compartment lighting of a motor vehicle, which comprises a light source and a light guide, the light source extending in front of a main face of the guide, the light guide comprising at least one coupling face capable of reflecting into the light guide at least a part of the light emitted by the light source, and at least two decoupling faces at a distance from one another and arranged so as to reflect toward an output face of the light guide the light coming from the coupling face. This device furthermore comprises a reading light.

18 Claims, 5 Drawing Sheets

(56) References Cited

U.S. PATENT DOCUMENTS

| | | | |
|---|---|---|---|
| 7,963,689 B2* | 6/2011 | Lee | F21V 7/0016 362/245 |
| 2004/0047161 A1 | 3/2004 | Mochizuki et al. | |
| 2004/0130904 A1 | 7/2004 | Yamada et al. | |
| 2005/0242607 A1* | 11/2005 | Neumann | B60Q 3/004 296/39.1 |
| 2006/0171159 A1 | 8/2006 | Anderlini | |
| 2009/0219730 A1* | 9/2009 | Syfert | B60K 37/02 362/489 |
| 2013/0135358 A1* | 5/2013 | Yin | G02B 6/0023 345/690 |

FOREIGN PATENT DOCUMENTS

| | | |
|---|---|---|
| DE | 10338788 A1 | 4/2005 |
| EP | 1835224 A1 | 9/2007 |
| EP | 2384934 A1 | 11/2011 |
| FR | 2853392 A1 | 10/2004 |

\* cited by examiner

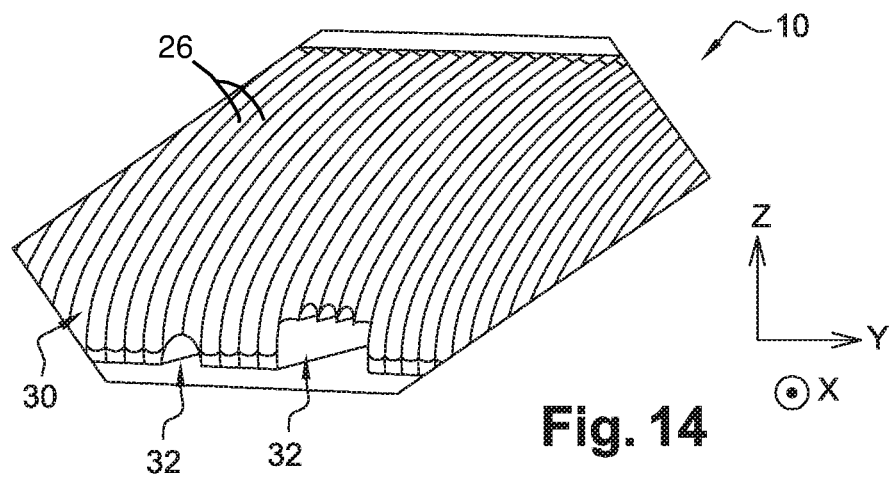
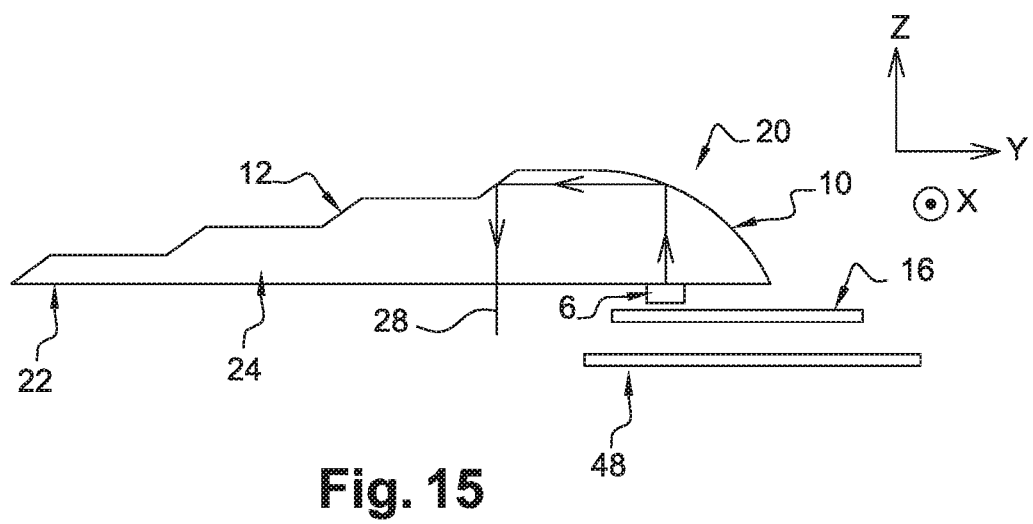

MOTOR VEHICLE LIGHTING AND/OR SIGNALING DEVICE

CROSS-REFERENCE TO RELATED APPLICATIONS

This application is the U.S. National Phase application of PCT Application No. PCT/EP2013/069589 filed Sep. 20, 2013, which claims priority to the French Application No. 1259013 filed on Sep. 26, 2012, which applications are incorporated herein by reference and made a part hereof.

BACKGROUND OF THE INVENTION

1. Field of the Invention

The invention relates to lighting and/or signaling devices for an automobile.

2. Description of the Related Art

It is known to provide such devices with a light guide and LEDs, the light rays of which are conveyed by the guide to the output of the device along a light line. A light beam is thus produced from a light guide having a linear, rectangular or curved profile.

When it is a roof light, the thickness of the lighting device is limited by the space available between the body and the passenger compartment of the vehicle. Generally, the size, the functional constraints and the arrangement of the constituent elements of the device, in particular the printed circuit and the light source, cannot easily satisfy the requirements of motor vehicle manufacturers in terms of thickness of the device.

There is therefore a need for a lighting and/or signaling device which can be implemented in reduced size, without sacrificing the photometry and without an excessive constraint on the arrangement of the light sources.

SUMMARY OF THE INVENTION

It is an object of the invention to produce a lighting or signaling device having a limited thickness, in which the light source can be freely arranged, while making it possible for example to produce at least two continuous light lines which are homogeneous along the profile of the line, whether they are straight lines or curves.

To this end, the invention provides a device for signaling or passenger compartment lighting of a motor vehicle, which comprises at least one light source and a light guide, the source extending in front of a main face of the guide, the guide comprising at least one coupling face capable of reflecting into the guide at least a part of the light emitted by the source, and at least two decoupling faces at a distance from one another and arranged so as to reflect toward an output face of the guide the light coming from the coupling face.

Thus, the arrangement of the source with respect to the guide makes it possible to reduce the thickness of the device, while maintaining good photometry of the light lines.

A "device for lighting a passenger compartment of a vehicle" is intended in particular to mean a lighting device intended to be mounted inside the passenger compartment of the vehicle and to illuminate some or all of this passenger compartment, for example a roof light, console lighting or a reading light.

Nevertheless, the invention is also applicable to lighting and/or signaling devices not forming a device for lighting the passenger compartment, for example external devices such as lights or headlamps.

A "coupling face" is intended to mean an optical surface arranged to allow the rays passing through it to propagate through the guide by total internal reflections in this guide.

A "decoupling face" is intended to mean an optical surface arranged in order to allow the rays coupled into the guide to be reflected or refracted so as to leave the guide.

Provision may be made for the light source to have an emission axis perpendicular to the main face.

Provision may also be made for the coupling face to be arranged at one of the ends of the guide.

Provision may be made for the coupling face of the guide to have a parabolic overall cross section, the coupling face preferably being convex as seen from outside the guide.

If the source is at the focus of the parabola, this shape allows the rays coming from the source and reflected by the coupling face to be directed into the guide in planes which are parallel, for example parallel to the main face of the guide. Provision may be made for the coupling face to comprise at least one relief capable of dispersing the light emitted by the source.

This dispersion improves the distribution of the light in the passenger compartment. The reliefs may comprise corrugations or fluting.

Preferably, the guide is made of transparent material and the coupling face is metallized.

The guide may be made of glass or synthetic material, for example PC or PMMA, which are more economical.

By virtue of the metallization of the coupling face, the reflection of the light coming from the source is improved, as is the efficiency of the latter.

Provision may also be made for one of the decoupling faces to comprise at least one means for dispersing light.

The two decoupling faces are separated by a total internal reflection zone arranged so that the light rays that reach it are totally reflected so as to remain coupled to the guide.

Thus, the light rays are reflected so that they reach the output face with a sufficiently large angle of incidence to be totally reflected again by this output face.

Thus, the light reflected by the decoupling face is dispersed so that it is widely visible.

For example, a means for dispersing light may be formed by vertical or horizontal fluting.

Preferably, the device comprises steps arranged in front of the output face, these steps comprising the decoupling faces.

Advantageously, the steps are formed by an alternation of decoupling faces and total internal reflection zones.

Advantageously, each decoupling face is arranged so as to reflect the light rays reaching it, in such a way that luminous bands are visible through the output face.

Thus, when the light source is on, the guide has a plurality of luminous lines on the output face.

The arrangement of the decoupling faces makes it possible to define the luminous pattern produced by the device. Specifically, the shape of the decoupling faces as well as their arrangement with respect to one another makes it possible to produce, for example, luminous lines at a distance from one another, which are linear or curved, and may meet.

Provision may be made in the device for the sources to be at least two in number, and preferably arranged in the same plane.

It is possible to provide as many sources as necessary so that all the decoupling faces receive light emitted by the sources, in order to maintain a constant photometry over all of the light lines.

Preferably, the device comprises a printed circuit parallel to the main face of the guide.

This arrangement of the sources and the circuit in a single plane advantageously makes it possible for the sources to be connected to a single circuit, and for them to be organized freely on the upper surface of the circuit. Furthermore, this organization allows the sources to dissipate the thermal energy which they emit over an extended surface (corresponding to the entire upper surface of the circuit).

A mask covering the printed circuit may also be provided. This mask has an essentially esthetic purpose and makes it possible to conceal unsightly components of the printed circuit.

Provision may be made for the device according to the invention also to comprise a mask which covers the coupling face or in which the outer wall of the coupling face is made opaque.

The guide preferably comprises a passage for mounting the source through the guide.

Advantageously, the guide comprises at least one isolated surface irregularity such as a surface alteration, for example on the main face, on the coupling face, on one of the decoupling faces or on the output face. This surface alteration is a modification such as an addition of material, a coating or local modification of the relief of the face in question, which may be a boss or a cavity. It may involve three-dimensional hollows, sometimes referred to as "micro-optics", the depth of which is expressed for example in tenths of a millimeter, or "pseudo-patterns" which are more surface patterns than volume patterns, with a very small depth, the depth of which is expressed rather in microns or tens of microns. The main function of these isolated surface irregularities is to disperse the light rays.

In one embodiment, the output face and the main face extend on opposite sides of the guide.

In another embodiment, the output face and the main face extend on the same side of the guide.

Provision may also be made for the device to furthermore comprise at least one directional lighting source and at least one redirection component capable of directing the light emitted by the directional lighting source to a focus of the component, located outside the guide.

The directional lighting source is a source separate from the source extending in front of the coupling face. It is intended to emit a light spot and has a reading light function.

This reading light is advantageously included in the overall thickness of the guide by virtue of its staircase architecture, and therefore maintains the small thickness characteristic of the assembly.

Other lighting (or activation) functions may be included in this thickness, for example lighting of the console.

The architecture of the guide is suitable for mixing a plurality of light sources, in particular of different colors.

The light emitted by the additional lighting source is transmitted by the redirection component inside the guide, through which it passes. It may optionally be dispersed by a surface alteration.

Preferably, the redirection component is interposed between the directional lighting source and the guide. Provision may be made for this component to be independent of the light guide and associated with the device by means of the printed circuit, on which it is fitted.

Preferably, the redirection component is arranged in such a way that it directs at least a part of the light of the directional lighting source toward a zone located between two decoupling faces.

If the shape of the zone located between two decoupling faces so allows, the light of the directional lighting source enters the guide, passes through it and emerges therefrom without being perturbed or reflected thereby.

Advantageously, the redirection component has an ellipsoidal overall shape. Its shape may be arranged so as to direct the light emitted by the directional lighting source in the desired direction.

Preferably, the redirection components are at least two in number and are connected to one another independently of the guide. Each of the redirection components associated with a respective directional lighting source may form a part of a single light beam or an independent individual light beam.

Advantageously, the guide has a variable thickness decreasing transversely from one end to the other.

Preferably, the guide does not have a support at the end where the thickness is smallest.

Preferably, the light source is arranged at the end where the thickness is greatest.

Advantageously, the guide is supported in the device by holding means arranged at the end where the thickness is the greatest. The printed circuit may also be used for at least one other technical function, for example for electronic door opening control.

These and other objects and advantages of the invention will be apparent from the following description, the accompanying drawings and the appended claims.

BRIEF DESCRIPTION OF THE ACCOMPANYING DRAWINGS

An embodiment of the invention and variants will now be described below by way of nonlimiting examples, with reference to the appended drawings.

Figure 7:
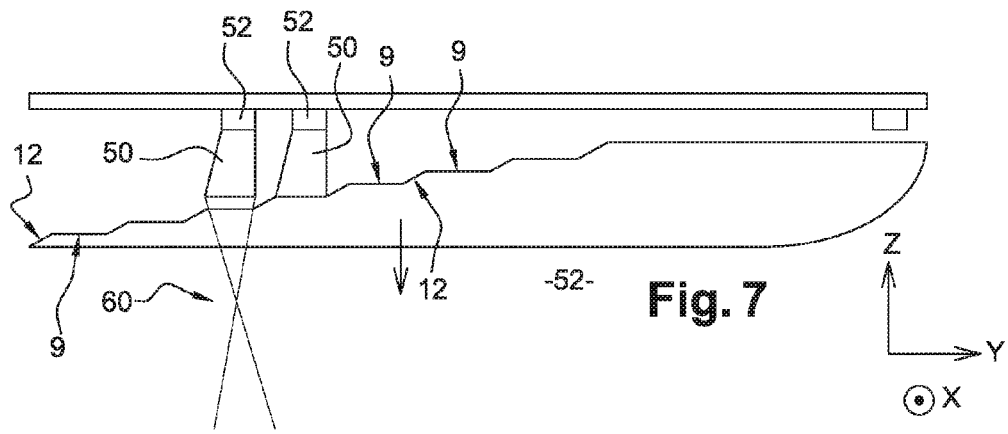
FIG. 7 is a view in section of the device according to the invention furthermore comprising a reading light.
Figure 8A:
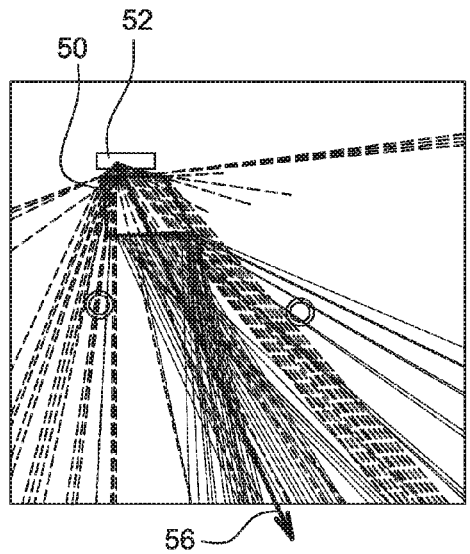
FIGS. 8A and 8B are schematic representations of the path of the light rays of the reading light of FIG. 7.
Figure 8B:
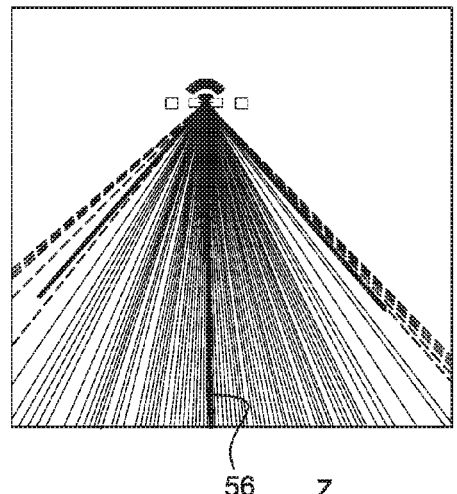
Figure 9:
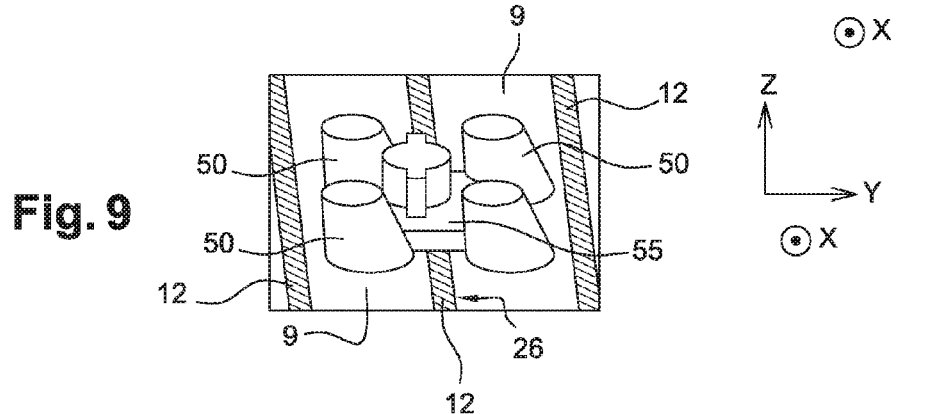
Figure 10:
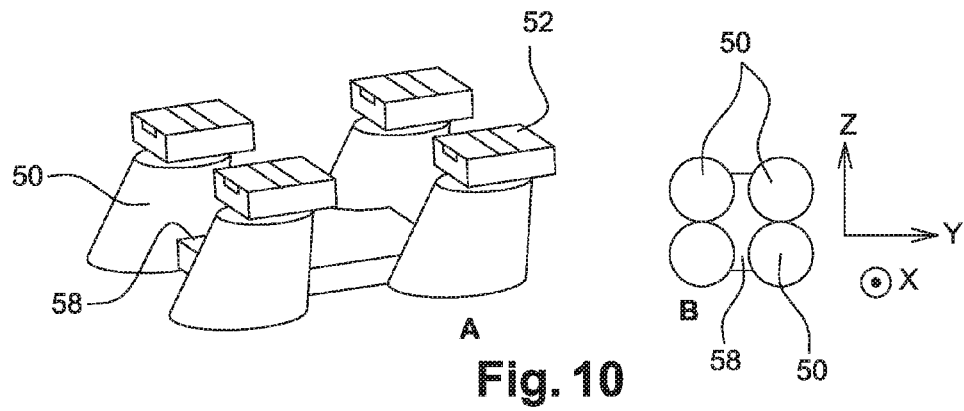
Figure 13:
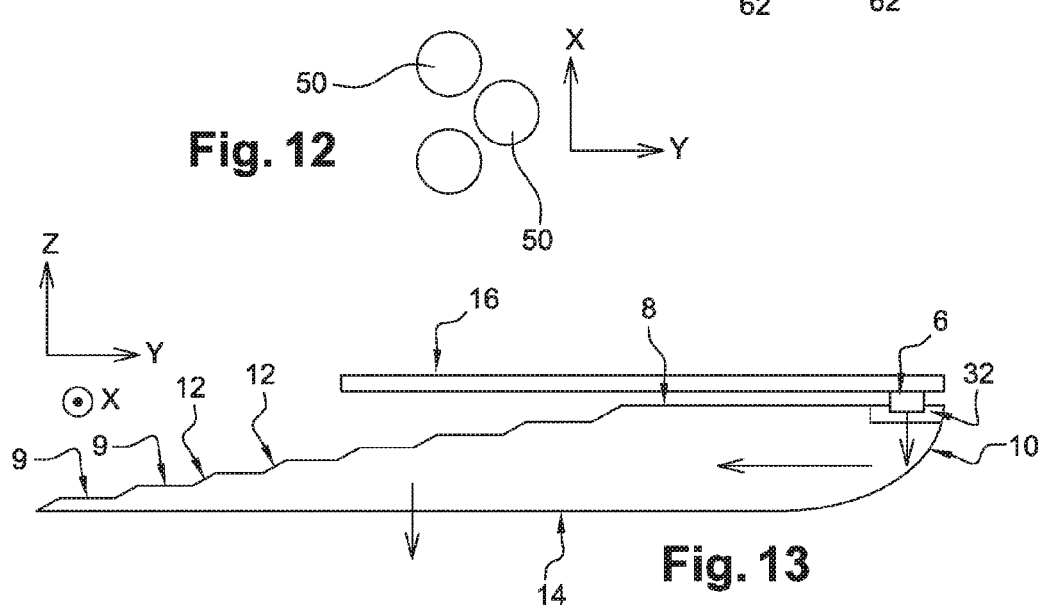

FIGS. 9, 10 (A and B), 11 (A, B and C) and 12 are schematic representations of variants of the device of FIG. 7;

FIG. 13 is a view in section of the device comprising a passage facilitating the insertion of the light source;

FIG. 14 is a perspective view of the coupling face of the light guide; and

FIG. 15 is a view in section of a second embodiment of the invention.

DETAILED DESCRIPTION OF THE PREFERRED EMBODIMENTS

The invention is applicable to lighting devices, in particular for the passenger compartment of a motor vehicle, for example a roof light, as well as signaling devices or lighting and signaling devices for such vehicles.

An orthogonal reference frame X, Y, Z is considered, in which the Z direction corresponds to the vertical axis of the vehicle, and Y and X are horizontal axes, with X corresponding to the driving direction of the vehicle. The device 2 comprises a light guide 4 and light sources 6.

Figure 5:
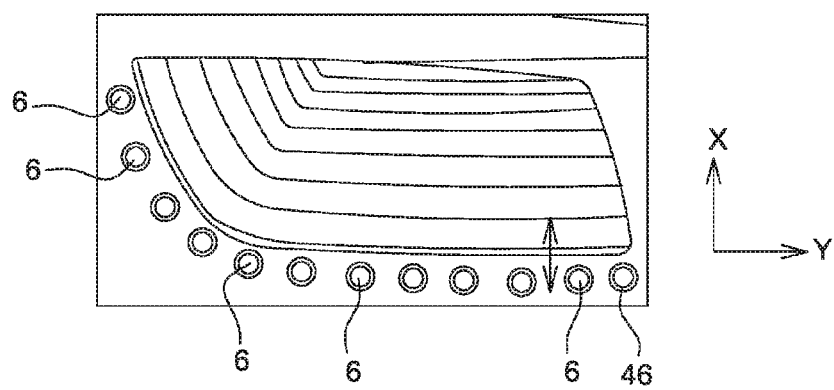
FIG. 5 is a plan view of the device showing the arrangement of the light sources.
Figure 6:
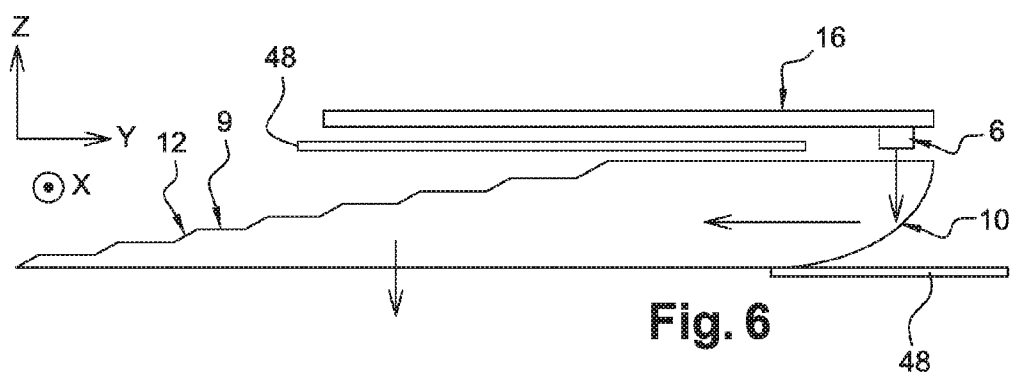
FIG. 6 is a view in section of the device having a mask covering the coupling face as well as another mask covering the printed circuit.

Each light source 6 has its principal axis parallel to the Z direction and perpendicular to the overall plane of the light guide 4. It extends in front of a face 8 of the latter so that the light emitted by the light source 6 enters therein through this face 8. Each light source 6 consists, for example, of one or more LEDs. The device 2 comprises a plane printed circuit 16, which is parallel to the X and Y directions and which carries the light sources 6 so that they are located in the same plane. The light sources 6 are arranged on the periphery of the light guide 4 in front of the face 8. It can be seen in FIG. 5 that the light sources 6 form a curved line. In FIG. 5, the position of the light sources 6 has been offset with respect to the light guide 4 in order to make them visible. This arrangement of the light sources 6 makes it possible to produce lines, as explained below.

The light guide 4 here forms a single solid piece extending in its length along Y and in its height along Z. It is produced by molding, preferably of a transparent plastic material, for example PMMA with a refractive index of 1.49, or polycarbonate with a refractive index of 1.59.

It may also be made of PC, a material which would favor placement of the light guide 4 as an external piece without the need for an additional protective screen. It comprises two main faces of planar overall shape, which are parallel to one another and to the X, Y plane, and which extend on opposite sides of the light guide 4. They respectively form the upper or main face 8 for entry of the light, directed toward the body, and the output or lower face 14 for exit of the light, oriented toward the passenger compartment of the vehicle.

The light guide 4 furthermore comprises a face 10 which has sections of parabolic shape. These sections are parallel to the X direction. However, they are not all parallel to one another. They are oriented so that each section of the light guide 4 parallel to the X direction and passing through one of the light sources 6 is parabolic. The light source 6 is located at the focus of the corresponding parabola. The face 10 reflects into the light guide 4 at least a part of the light coming from each light source 6 via the upper or main face 8. The rays reflected in this way are located in planes parallel to the X and Y directions. This upper or main face 8 has a series of reliefs 30, such as fluting illustrated in FIG. 14. The fluting or series of reliefs 30 is curved toward the outside of the light guide 4 and disperses the rays in each X, Y plane.

The light guide 4 comprises decoupling faces 12 at a distance from one another, which reflect independently of one another a part of the light coming directly from the face 10, directly toward the output or lower face 14. There are eight decoupling faces 12 in this case. This number is not limiting, and it may be less than or greater than this value.

In view of the arrangement of the light sources 6 in the present example, the decoupling faces 12 are not planar. They have a rectilinear profile in each of the aforementioned sections. This rectilinear segment is inclined with respect to the plane of the upper or main face 8 or plane face 9 at an angle α of between 1 and 89°, advantageously between 25 and 75°, and preferably between 35 and 65°. Here, it is equal to 45°. The decoupling faces 12 are organized in steps, that is to say with an alternation of decoupling faces 12 and plane faces 9 parallel to the X and Y axes.

Furthermore, the decoupling faces 12 have reliefs 26 such as fluting. They may also have any other relief making it possible to disperse the light outside the light guide 4.

Although the output or lower face 14 has a plane shape in this case, elements may be added thereto making it possible to disperse the light or impart a curved shape to it. The same is true for the upper or main face 8. FIG. 14 illustrates two passages 32 passing through the wall of the light guide 4 and the faces 10 and 8, and making it possible to mount light sources 6 in the device 2 when the light guide 4 is already in place in front of the printed circuit 16. They are cut out from the material in various shapes along the X and Y axes, for example wells. They do not, however, have any effect on the implementation of the device 2.

Figure 2:
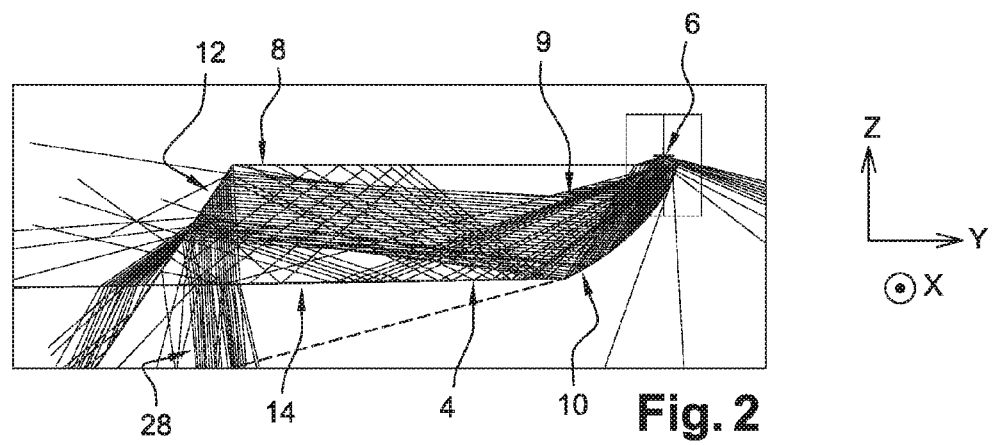
FIG. 2 is a view in section of the device of FIG. 1 showing the path of the light rays.
Figure 3:
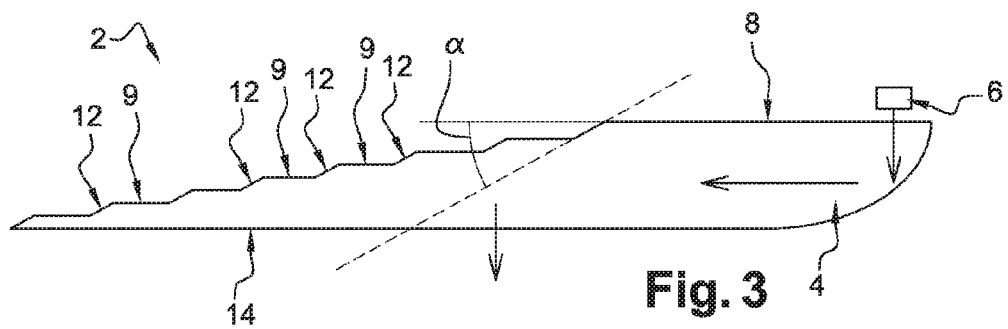
FIG. 3 is a view similar to FIG. 1 showing the arrangement of the decoupling faces.

The path of the light emitted by each light source 6 inside the light guide 4 is represented in FIG. 2 and manifested by the rays 28. The rays 28 emitted by the light source 6 propagate into the light guide 4 through the upper or main face 8, toward the coupling face 10 which reflects them inside the light guide 4 along X, Y planes parallel to the upper or main face 8. These rays 28 propagate in the light guide 4 until they are reflected by the decoupling faces 12 toward the output or lower face 14, so that they are widely visible from the outside.

Figure 4:
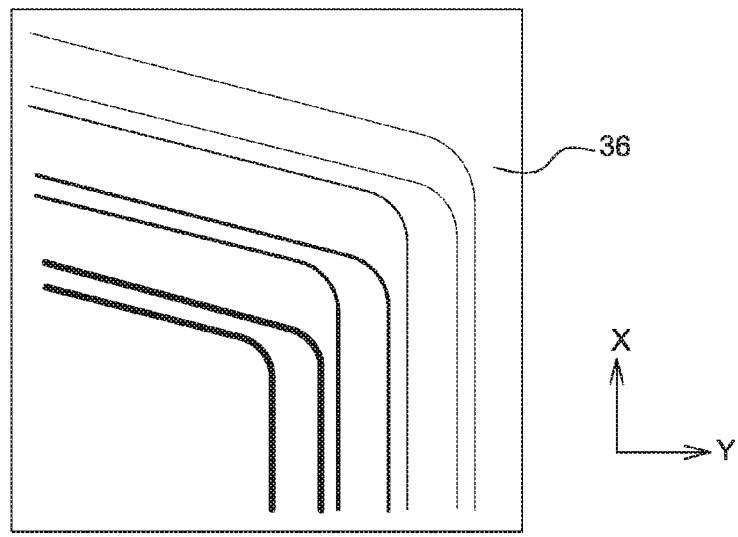
FIG. 4 is a front photograph of a luminous pattern produced by a device according to the invention.

The light guide 4 may in this case form a luminous pattern illustrated in FIG. 4, comprising light lines 36 extending over the output or lower face 14 in correlation with the positioning of the decoupling faces 12. The light lines 36 may be straight or curved, and may or may not meet.

In this figure, the pattern consists of seven light lines 36 at variable distances from one another, also having straight segments and a curved portion in the central part. The photometry is homogeneous inside the light lines 36. The invention is not limited only to the pattern represented in FIG. 4, and may produce other patterns.

The device 2 comprises a mask 48 for making the printed circuit 16 invisible. This mask 48 has an essentially esthetic purpose, making it possible to conceal the unsightly parts of the printed circuit 16 as well as possible other electrical components present.

Figure 11:
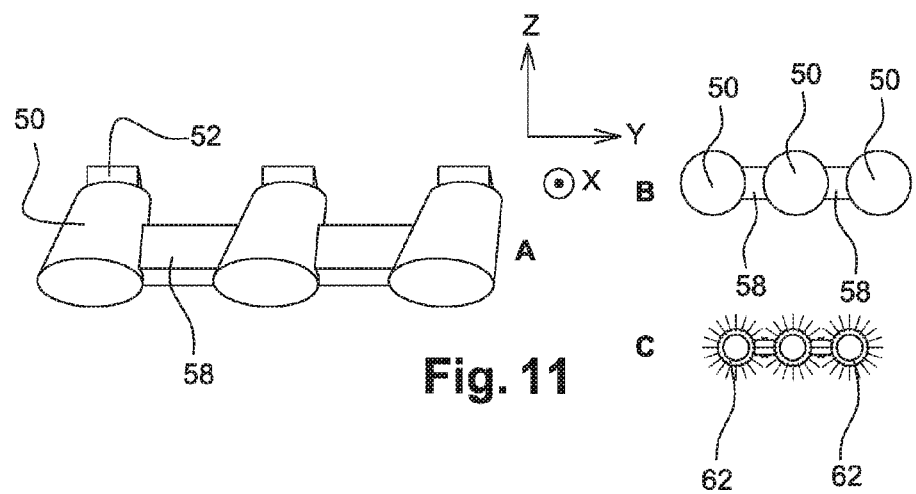
Figure 12:
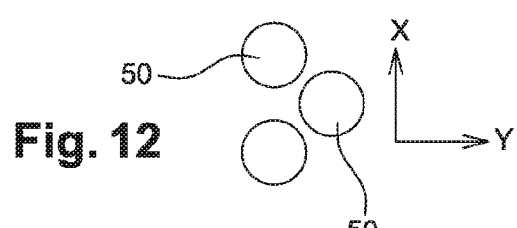

With reference to FIG. 7, the device 2 furthermore comprises directional lighting sources 52 and, for each of these, a respective component 50 redirecting the light, capable of directing the light emitted by this lighting source 52 toward a focus 60 of the component 50 located outside the light guide 4 and represented schematically in FIG. 11. In this case, the device 2 comprises two lighting sources 52 of this type. This number is not limiting, and may be smaller or larger. It is preferably between 1 and 4. There are three of these lighting sources 52 in FIGS. 11 and 12, and four in FIGS. 9 and 10, which illustrate alternative embodiments.

The lighting sources 52 are carried by the printed circuit 16 and oriented with their principal axis parallel to the Z direction. These lighting sources 52 are positioned, in their major part or in their totality, in front of plane faces 9 of the light guide 4, between two decoupling faces 12. They may be arranged freely. For example, they may be aligned, arranged in a square, a circle, or a triangle, as represented in FIG. 11. Each redirection component 50 has an ellipsoidal overall shape which may have an inclination of its major axis with respect to the Z and Y directions, as represented in FIG. 7.

It is arranged between the printed circuit 16 and the light guide 4. Preferably, the redirection component 50 is independent of the light guide 4 and fixed to the printed circuit 16.

This component 50 reflects some of the rays coming from the lighting source 52 toward the focus 60 of the component which is located outside the light guide 4. The principal direction of the rays is manifested by the arrow 56. When the device 2 has a plurality of components 50, they may be fixed to one another by a means 58 which allows them to be held together to the printed circuit 16, or they are formed in a single piece with this means 58.

The lighting sources 52 make it possible to obtain one or more light spots 62.

The lighting sources 52 and components 50 may be organized so as to generate a single light spot, or so as to produce as many light spots as there are directional lighting sources 52 and redirection components 50 present.

Figure 1:
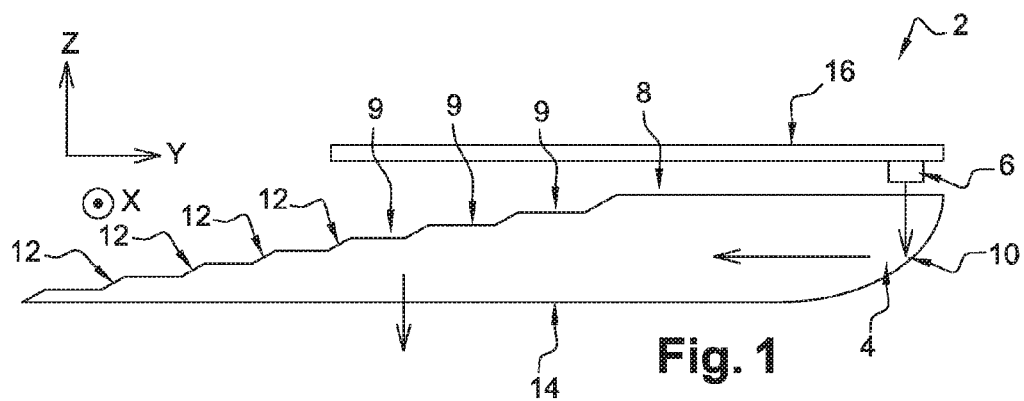
FIG. 1 is a view in section of a preferred embodiment of the lighting device.

In the embodiment illustrated in FIG. 15, the device 20 differs from that of FIG. 1 in that the main light face and the light output face extend on the same side of the light guide 4 and preferably form the same face 22.

Furthermore, the decoupling faces 12, again arranged in steps, extend in front of the output face 22 on the opposite side of the light guide 4. The printed circuit 16 is arranged at one end of the light guide 4, in front of the face 22, and as far as an end zone corresponding to the emission zone of the luminous pattern. The other aspects of the device 2 are unchanged. The rays 28 emitted by the light source 6 propagate into the light guide 4 through the face 22, to the coupling face 10 which reflects them inside the light guide 4 in planes which are substantially parallel to the face 22. These rays 28 are reflected by the decoupling faces 12 to the face 22 of the light guide 4.

The device 2 may also comprise a mask 48 with an aesthetic purpose in order to conceal the components of the printed circuit 16.

One or more reading lights as defined above may also be added to this embodiment.

Of course, numerous modifications may be made to the invention without departing from the scope thereof.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for signaling or passenger compartment lighting of a motor vehicle wherein said device comprises at least one light source and a light guide;
    said at least one light source extending in front of a main face of said light guide;
    said light guide comprising at least one coupling face capable of reflecting into said light guide at least a part of the light emitted by said at least one light source, and at least two decoupling faces at a distance from one another and arranged so as to reflect toward an output face of said light guide the light coming from said at least one coupling face;
    said device further comprising at least one directional lighting source and at least one redirection component capable of directing the light emitted by said at least one directional lighting source to a focus of said at least one redirection component, wherein said focus is located outside said light guide, wherein there is substantially no propagation of the light by at least one total internal reflection zone.

2. The device as claimed in claim 1, wherein said at least one light source has an emission axis perpendicular to said main face.

3. The device as claimed in claim 1, wherein said at least one coupling face is arranged at one of the ends of said light guide.

4. The device as claimed in claim 1, wherein said at least two decoupling faces comprise at least one relief capable of dispersing the light emitted by said at least one light source.

5. The device as claimed in claim 1, wherein at least one of said at least two decoupling faces comprises at least one means for dispersing light.

6. The device as claimed in claim 1, wherein said at least two decoupling faces are separated by said at least one total internal reflection zone arranged so that the light rays that reach it are totally reflected so as to remain coupled to said light guide.

7. The device as claimed in claim 1, wherein each of said at least two decoupling faces is arranged so as to reflect the light rays reaching it, in such a way that bands are visible through said output face.

8. The device as claimed in claim 1, which comprises a printed circuit parallel to said main face of said light guide.

9. The device as claimed claim 1, wherein said light guide comprises a passage for mounting said at least one light source through said light guide.

10. The device as claimed in claim 1, wherein said light guide comprises at least one isolated surface irregularity comprising a surface alteration on at least one of said main face, on at least two coupling faces, on at least one of said at least two decoupling faces or on said output face.

11. The device as claimed in claim 1, wherein said output face and said main face extend on opposite sides of said light guide.

12. The device as claimed in claim 1, wherein said output face and said main face extend on the same side of said light guide.

13. The device as claimed in claim 1, wherein said at least one redirection component is interposed between said at least one directional lighting source and said light guide.

14. The device as claimed in claim 1, wherein said at least one redirection component is arranged in such a way that it directs at least a part of the light of said at least one directional lighting source toward a zone located between said at least two decoupling faces.

15. The device as claimed in claim 1, said light guide having a variable thickness decreasing transversely from one end to the other.

16. The device as claimed in claim 15, said light guide not having a support at the end where the thickness is smallest.

17. The device as claimed in claim 1, wherein said at least one redirection component comprises a generally ellipsoidal overall shape.

18. The device as claimed in claim 17, wherein said generally ellipsoidal overall shape is inclined relative to a face of said at least one redirection component.

* * * * *